(12) United States Patent
Martindale et al.

(10) Patent No.: US 9,009,666 B1
(45) Date of Patent: Apr. 14, 2015

(54) SYSTEMS AND METHODS FOR TESTING SOFTWARE AND FOR STORING AND TRACKING TEST ASSETS WITH THE SOFTWARE

(75) Inventors: Bradley L. Martindale, San Antonio, TX (US); Andre Wiradarma, San Antonio, TX (US); John Ensminger, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1431 days.

(21) Appl. No.: 12/130,114

(22) Filed: May 30, 2008

(51) Int. Cl.
*G06F 9/44* (2006.01)
*G06F 11/36* (2006.01)

(52) U.S. Cl.
CPC .................... *G06F 11/368* (2013.01)

(58) Field of Classification Search
CPC ...................................... G06F 11/368
USPC .......................................... 717/122
See application file for complete search history.

(56) References Cited

U.S. PATENT DOCUMENTS

| | | | |
|---|---|---|---|
| 5,835,911 A * | 11/1998 | Nakagawa et al. | 1/1 |
| 6,182,245 B1 | 1/2001 | Akin et al. | |
| 6,336,217 B1 * | 1/2002 | D'Anjou et al. | 717/121 |
| 6,715,108 B1 * | 3/2004 | Badger et al. | 714/38.1 |
| 7,930,683 B2 * | 4/2011 | Li | 717/124 |
| 8,561,020 B2 * | 10/2013 | Hammer et al. | 717/111 |
| 2005/0193269 A1 | 9/2005 | Haswell et al. | |
| 2005/0229159 A1 * | 10/2005 | Haba et al. | 717/122 |
| 2006/0230384 A1 | 10/2006 | Potts et al. | |
| 2007/0094189 A1 * | 4/2007 | Yamamoto et al. | 706/45 |
| 2007/0143330 A1 * | 6/2007 | Tang | 707/102 |
| 2008/0059977 A1 * | 3/2008 | Brown et al. | 719/316 |
| 2009/0037881 A1 * | 2/2009 | Christy et al. | 717/124 |
| 2009/0144698 A1 * | 6/2009 | Fanning et al. | 717/120 |

FOREIGN PATENT DOCUMENTS

| | | |
|---|---|---|
| EP | 869433 A2 * | 10/1998 |
| WO | 2006130684 | 12/2006 |

OTHER PUBLICATIONS

Sheppard, JW et al "Recent Advances in IEEE Standards for Diagnosis and Diagnostic Maturation", Proceedings of the 2006 IEEE Aerospace Conference, 2006. [retrieved on Jan. 15, 2008]. Retrieved from the Internet: <URL: http://www.cs.jhu.edu/~jsquad/pubs/aero-2006a.pdf>.

* cited by examiner

*Primary Examiner* — Wei Zhen
*Assistant Examiner* — Lanny Ung
(74) *Attorney, Agent, or Firm* — Kane Kessler, P.C.; Barry E. Negrin

(57) ABSTRACT

A test for a piece of software may be created, and stored with the software. The software and the test may be stored in a code repository, where the test appears in a dependency graph, and is subject to version tracking, in a manner similar to other components of the software. These mechanisms may be used to determine whether a test is current relative to the software component that the test is used to evaluate. Tests may be developed by the software developers, by test developers, or by anyone else. Tests may be specified in a generic format, such as an eXtensible Markup Language (XML) format that meets some schema. The generic format test may be converted into a script that is usable with various script engines, thereby allowing tests to be developed in a test-engine-independent manner.

20 Claims, 6 Drawing Sheets

SYSTEMS AND METHODS FOR TESTING SOFTWARE AND FOR STORING AND TRACKING TEST ASSETS WITH THE SOFTWARE

CROSS REFERENCE TO RELATED APPLICATIONS

This application is related to U.S. patent application Ser. No. 12/235,082 filed Sep. 22, 2008, and U.S. patent application Ser. No. 12/235,094 filed Sep. 22, 2008, filed as divisional applications of the instant application, the disclosures of which are incorporated in their entirety.

BACKGROUND

Testing is a normal part of the software development process. Software under development is commonly tested by providing various types of input to the software and observing the software's behavior. The input may be provided by a person. For example, in an interactive application, such as a web application, a person could test the application by manually providing various types of input to the software through a browser. However, in many cases, the process of providing input is automated.

There are various test engines that automate testing of software (e.g., Hewlett Packard QuickTest Pro, Rational Functional Tester, and Borland Silk Test). These test engines are typically based on record-and-playback-type techniques. When a complete version of the software to be tested has been produced, a tester may develop test scenarios and create scripts that may be "replayed" to interact with the software. These scripts may be created by using a scripting language to enter instructions for interacting with the software, or by recording a tester's actual interactions with the software and storing the recorded results in a scripting language. In these kinds of testing systems, the script tends to be specific to one test engine, and is not easily ported for use by different test engines.

Moreover, the nature of a record-and-playback approach is that it typically presumes the existence of a finished piece of software before a test is created. In the software development cycle, testing is the phase that occurs between construction and delivery. Since the delivery date is normally fixed and construction usually takes longer than expected, time may be taken away from the testing phase to meet the delivery date. If development of a test starts after construction of the software is complete, then testing may be inadequate.

SUMMARY

Tests may be created for a software component. A test may be stored as a specification of how to interact with software that uses the component. The specification may, for example, be stored in an eXtensible Markup Language (XML) form, in accordance with some XML schema. Using XML to specify the test allows the specification of the test to be independent of the particular test engine that would be used to perform the test. In order to use the XML test specification with a particular test engine, the test may be converted from XML to a particular scripting format used by the test engine. Moreover, the test may be treated as an asset that is stored along with the code assets in a repository. As such, the test may be subject to the various rigors that are normally imposed on records of code assets, such as versioning and dependency. Therefore, it is possible to use the normal mechanisms of the code repository to determine whether a test is up-to-date relative to the component that is being tested.

Software may be built from components, and the development of tests may be modularized such that a test applies to a particular component. For example, different web applications may share one logon program, which may be implemented as a component. A test may be developed for the logon program, and this test may be used in any application that uses the logon program. Different tests may be developed for the same component—e.g., the code developer may write one test while the code is being written, and a test developer may write another test after the code is being written. Both of these tests could be stored as assets in a code repository. The ability to develop tests on a per-component basis may allow tests to be developed relatively early in the code development cycle—e.g., before a full application has been built (although tests could be developed at any time). Moreover, allowing tests to be written on a per-component basis and/or in a way that is independent of the particular test engine that will be used may facilitate re-use of test components, which may reduce costs of testing new software. Moreover, the subject matter described herein may, in various ways, simplify the process of developing tests for software and/or running those tests, thereby reducing the labor (and other) cost associated with developing and testing the software.

This summary is provided to introduce a selection of concepts in a simplified form that are further described in the detailed description section. This summary is not intended to identify key features or essential features of the claimed subject matter, nor is it intended to be used to limit the scope of the claimed subject matter.

DETAILED DESCRIPTION

Commercial software is normally tested before full-scale deployment. Testing is normally performed by testers' interacting with the software. Some tests are designed to verify that routine functions of the software are working, and some tests are designed to break the software in order to evaluate the software's robustness in situations where the software might be used in a manner outside the expected norms (e.g., through malevolence, or accidental misuse). The tester may interact with the software manually, or using a test engine. A test engine interacts with the software using a script that drives the interaction. In many cases, the script emulates a human's interaction with the software, although a script could emulate any type of interaction.

Scripts are normally specific to a particular test engine. There are various test engines available, either with its own scripting language and other peculiarities. The subject matter described herein may allow a particular software test to be specific in a manner that is independent of any given test engine. The specification may be stored, for example, in an eXtensible Markup Language (XML) form, and may then be converted to the form used by a particular test engine when the test is to be performed. This mechanism for representing a test allows the test to be developed independently of a particular test engine.

Additionally, the nature of testing is normally such that tests are developed after the code software to be tested has been built. Thus, a full application is normally constructed before tests are developed and run on the software. The subject matter described herein allows some tests to be designed and specified while the code is being written, thereby allowing test development to proceed in parallel with code development. Moreover, the subject matter herein allows tests to be developed in a modularized fashion—e.g., for a particular component. Thus, a particular component is part of, or used by, a finished application, then a test written for the component may be used as part of a test for the finished application. Additionally, a test may be stored as an asset in a code repository along with the software. Thus, the test may be subject to the rigors of versioning, dependency, etc., thereby allowing tests to be tracked in a manner similar to how software is tracked.

Figure 1:
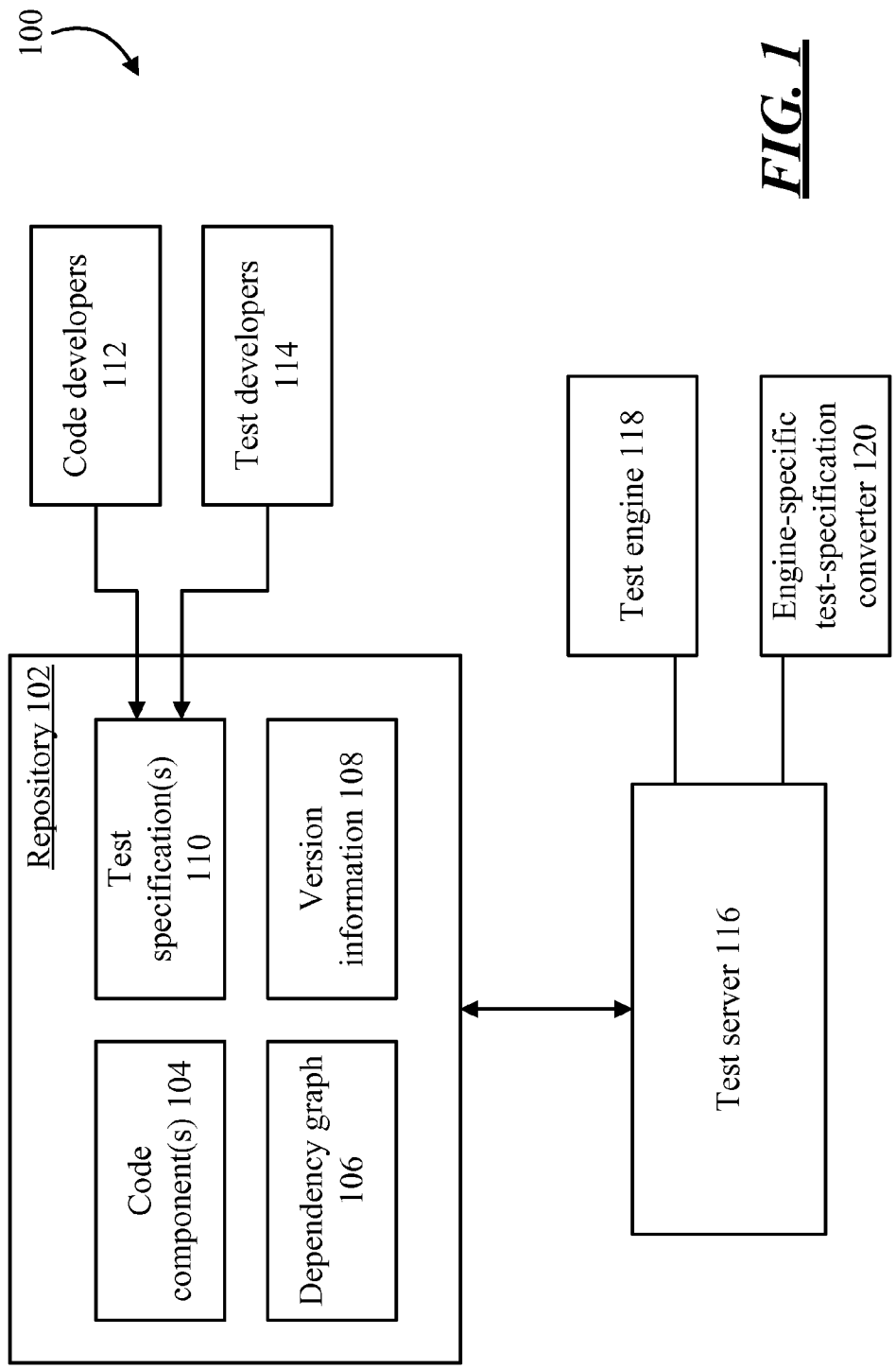
FIG. 1 is a block diagram of an example scenario in which tests for software may be developed and/or used.
Figure 2:
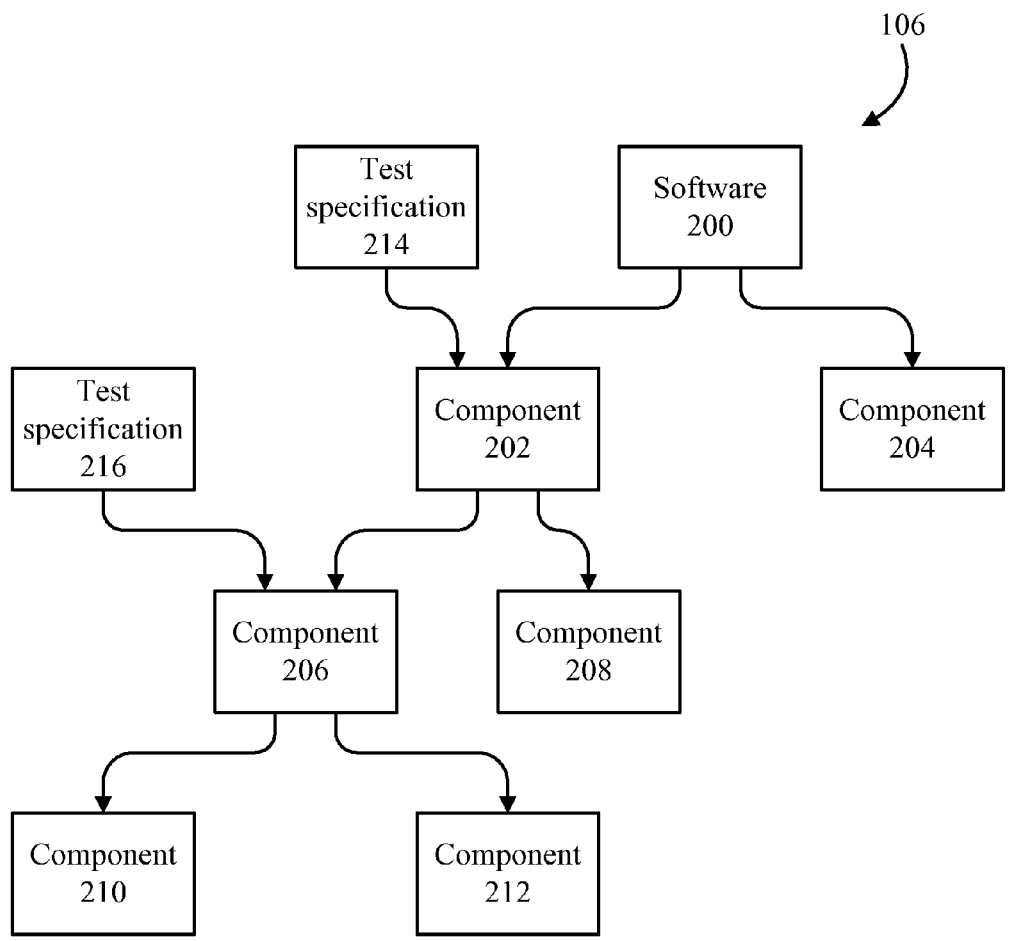
FIG. 2 is a block diagram of an example dependency graph.

Turning now to the drawings, FIG. 1 shows an example scenario 100 in which tests for software may be developed and/or used. Repository 102 stores software assets. Code component(s) 104 are examples of software assets that may be stored in repository 102. Repository 102 also may store metadata, such as dependency graph 106 and versioning information 108. Dependency graph 106 may define relationships between different code components. For example, if a banking web application makes use of a logon program, then dependency graph 106 may describe the web application as being dependent on the logon program. An example of dependency graph 106 is shown in FIG. 2 and is discussed subsequently. Software assets, such as code component(s) 104, may have different versions. Version information 108 indicates the various versions of the assets that are in repository 102. For example, if a particular component is revised nine times after it is written, then version information 108 may indicate that there are versions of that component number 1.0 through 1.9. Moreover, to the extent that different versions of a particular asset may be stored in different files, version information 108 may associate particular version numbers with particular files.

Repository 102 may also store test assets, such as test specification(s) 110. Test specification(s) 110 are descriptions of tests that could be performed on particular code component(s) 104. Test specification(s) 110 may specify a test to be performed in an XML, but could also specify the test to be performed using any other format. If an XML format is used, then the specification may conform to some XML schema. Test assets, such as test specification(s) 110, may be represented in dependency graph 106. For example, a test may relate to a particular component, or version of that component, in which case the specification of that test may be indicated in dependency graph 106 as being dependent on the component to which the test relates.

Test specification(s) 110 may be provided by various sources, such as code developers 112 and/or test developers 114. For example, code developers 112 may be people who are writing code component(s) 104. These developers may have detailed knowledge about how the code works, and thus may be able to devise appropriate tests for the code. Moreover test developers 114 may have expertise in "breaking" software, and thus may be able to devise tests for the software using that expertise. Code developers 112 could create tests for the software at the time the software is being written, thereby allowing some tests to be created in parallel with development of the software. However, code developers 112 could create tests at any time. Similarly, test developers 114 could create tests at any time, although test developers 114 might create tests for a code component after development of that component (e.g., based on an analysis of the component after the component has been written), or otherwise at a time and in a manner that is independent of the development of the component. Software developers 112 and test developers 114 are examples of entities that could create and/or provide tests for a particular code component. These tests could be provided by any entity.

Test server 116 is a machine (or other component) that runs tests on an application. Test server 116 may communicate with repository 102 to receive the code to be tested and/or the specification of the test to be performed. Test server 116 may be remote and/or separate from repository 102. Thus, test server 116 may be able to retrieve software and test assets remotely, and then run a test on the software based on the retrieved test assets.

Test server 116 may use a test engine 118 to perform the test. Test engine 118 may comprise software that operates a piece of software to be tested, based on a particular test script. As previously noted, test specification(s) 110 stored in repository 102 may be in a format that is not specific to a particular text engine, such as an XML format that follows some schema. Different test engines typically employ different scripting languages and/or formats. In order to allow a particular test specification to be used to with test engine 118, test server 116 may employ engine-specific test-specification converter 120. Converter 120 converts a test specification that is in a non-engine-specific format into a script that is applied by a particular engine, such as test engine 118. If the test specification is in an XML form, then the XML schema associated with the specification could be used as part of the process of interpreting the specification and converting that specification into an engine-specific script. Converter 120 may be chosen from a plurality of different converters, where each converter converts the test specification into a script for a different test engine.

FIG. 2 shows an example of dependency graph 106. In the example of FIG. 2, an arrow indicates that the source of the arrow (the nodes where the arrow begins) is dependent on the target. Each of the nodes in FIG. 2 represents an asset that may be stored in a repository, such as repository 102 (shown in FIG. 1). Dependency graph 106 is an example of a record that a repository may maintain of relationships between different assets.

Software 200 is an example of an asset. Software 200 may, for example, be a particular application program, or other type of program. Software 200 may be implemented using various components, and thus dependency graph 106 may show software 200 as being dependent on the components that it uses. Software 200 is shows as being directly dependent on components 202 and 204. Since components 202 and 204 are dependent on other components, software 200 may be understood as having indirect dependencies on other components, such as components 206, 208, 210, and 212.

One understanding of a dependency is that, for a first asset to be dependent on a second asset, means that some action is to be taken if the second asset is newer than the first asset. The nature of the action may depend on the types of assets involved in the relationship. For example, if the assets are two components where one is used in the implementation of the other (e.g., component 202 is dependent on component 206), then the action to be taken if component 206 is newer than component 202 is to recompile or re-link component 206 with component 202. When the dependency relationship is between a test asset and a component, then dependency may mean that the test asset is to be updated (e.g., rewritten, or considered for rewriting) before being used to test a component, since a component that is newer than its test might have new behaviors that are not taken into account by the test.

In the example of FIG. 2, dependency graph 106 is shown as having nodes for test specifications 214 and 216. These test specifications are examples of test assets that may be stored in a repository. Test specification 214 may be a test for component 202, and test specification 216 may be a test for component 206. Each of these test specifications is dependent on its respective component. This dependency may mean that a test specification is considered up to date if it is at least as new as (i.e., does not antedate) the component on which it is dependent, and may be considered for possible rewriting if a new version of the component is created after the test is created. A determination as to whether a test antedates its component may be made by comparing, e.g., the "last-modified" dates associated with the test and the component.

Typically, dependency graphs in software repositories represent code components, such as applications and/or the components of which they are built. However, test assets may be inserted into such a graph, thereby allowing the test assets to make use of the dependency, versioning, etc., that a repository provides.

Figure 3:
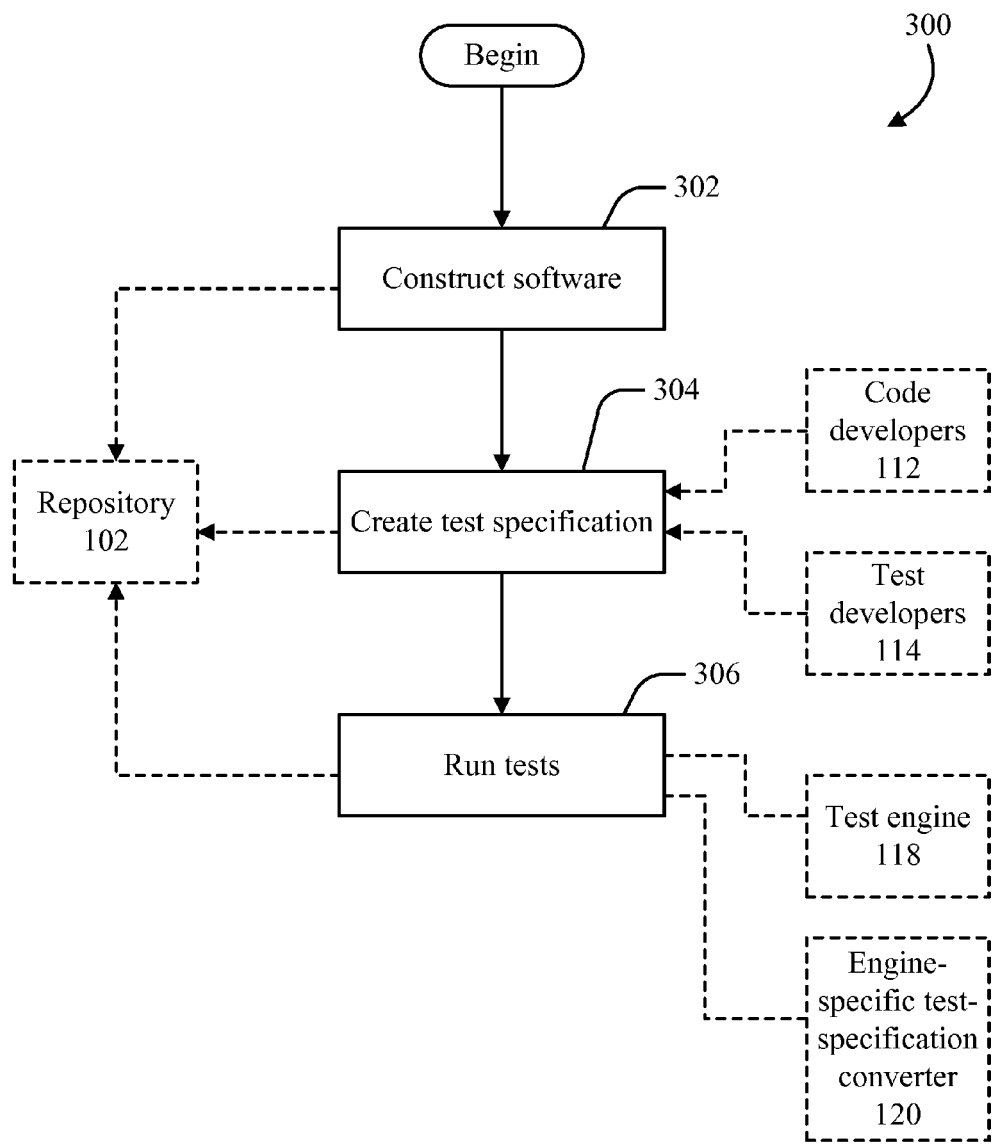
FIG. 3 is a flow diagram of an example process in which software is developed and tested.
Figure 4:
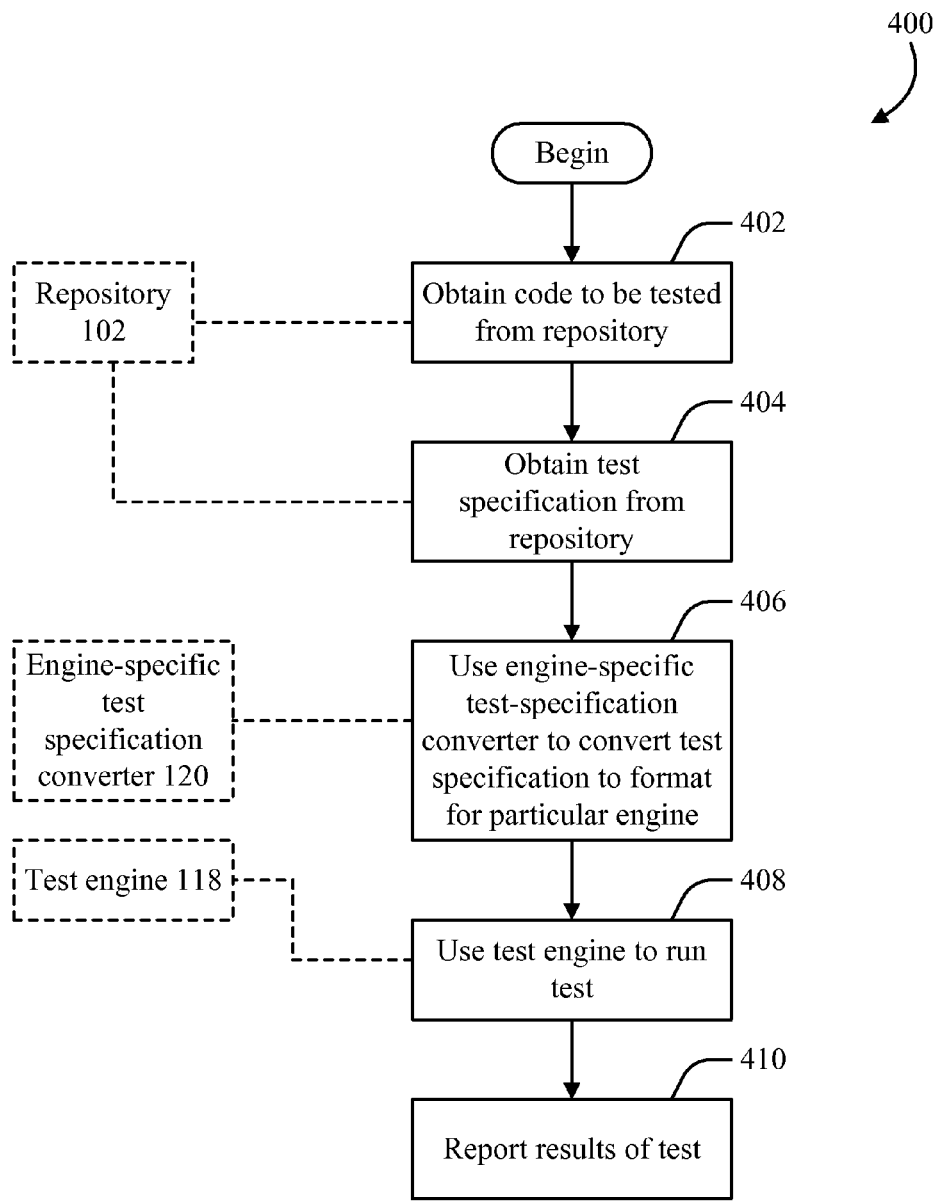
FIG. 4 is a flow diagram of an example process in which a test server retrieves code and test assets and performs a test.

FIG. 3 shows an example process 300 in which software is developed and tested. Before turning to a description of the process, it is noted that the processes in FIGS. 3 and 4 are described, by way of example, with reference to components shown an described herein, although these processes may be carried out in any system and using any components. Additionally, each of the flow diagrams in FIGS. 3-4 shows an example in which stages of a process are carried out in a particular order, as indicated by the lines connecting the blocks, but the various stages shown in these diagrams may be performed in any order, or in any combination or sub-combination.

At 302, the software is constructed—e.g., by coding the software. Creation of software may involve other states that precede the coding, such as analysis and design. These stages may exist, but are not shown in FIG. 3. The code that is written as part of the software construction stage may be stored. Code repository 102 is an example of a place in which the code may be stored.

At 304, a specification of a test may be created. The specification may be created by code developers 112, test developers 114, or by any other entity. The test specification may be stored, for example, in repository 102.

At 306, tests on the software are run, using the test specification. The test specification may be retrieved, for example, from repository 102. As previously noted, the test specification may be in a non-engine-specific format, such as XML that follows some schema. Running the test may involve using an engine-specific test-specification converter 120, to convert specification into a script in a language usable by test engine 118. The script may then be used to interact with the software that is being tested. This interaction may be driven by test engine 118.

As previously noted, testing of software may be performed by a test server. The test server may, for example, be remote from the repository in which the code assets and test assets are stored. FIG. 4 shows an example process 400 in which a test server (which may or may not be remote from a repository) retrieves code and test assets and performs a test.

At 402, code to be tested is obtained. For example, a test server (e.g., test server 116, shown in FIG. 1) may obtain this code from repository 102 as part of a request to perform a test on a specific piece of software. At 404, a test specification is obtained. For example, the test server may obtain the specification of a test from repository 102.

When the code to be tested, and the test specification, are obtained from repository 102, a check may occur based on a dependency graph (e.g., dependency graph 106, shown in FIGS. 1 and 2), and/or based on version information 108 (shown in FIG. 1), in order to determine if the test specification is current relative to the code to be tested. In one example, this check is made by the repository—e.g., the repository may assess the test's currency relative to the code before delivering the test. As another example, the check could be made by the test server—e.g., the test server could consult the repository's dependency graph and version information, and could then determine whether the test is current relative to the code. A check to determine whether the test specification is current relative to the code could be performed in any manner.

At 406, an engine-specific test-specification converter (e.g., converter 120) may be used to convert the test specification from a non-engine-specific format into a scripting language that is usable by a particular test engine.

At 408, a test engine (e.g., test engine 118) may be used to run a test on the code. At 410, the results of the test may be reported. For example, the code's response to the input provided by the test engine could be reported to a test operator or other person, in order to provide some information about how the software behaves under a test scenario.

Figure 5:
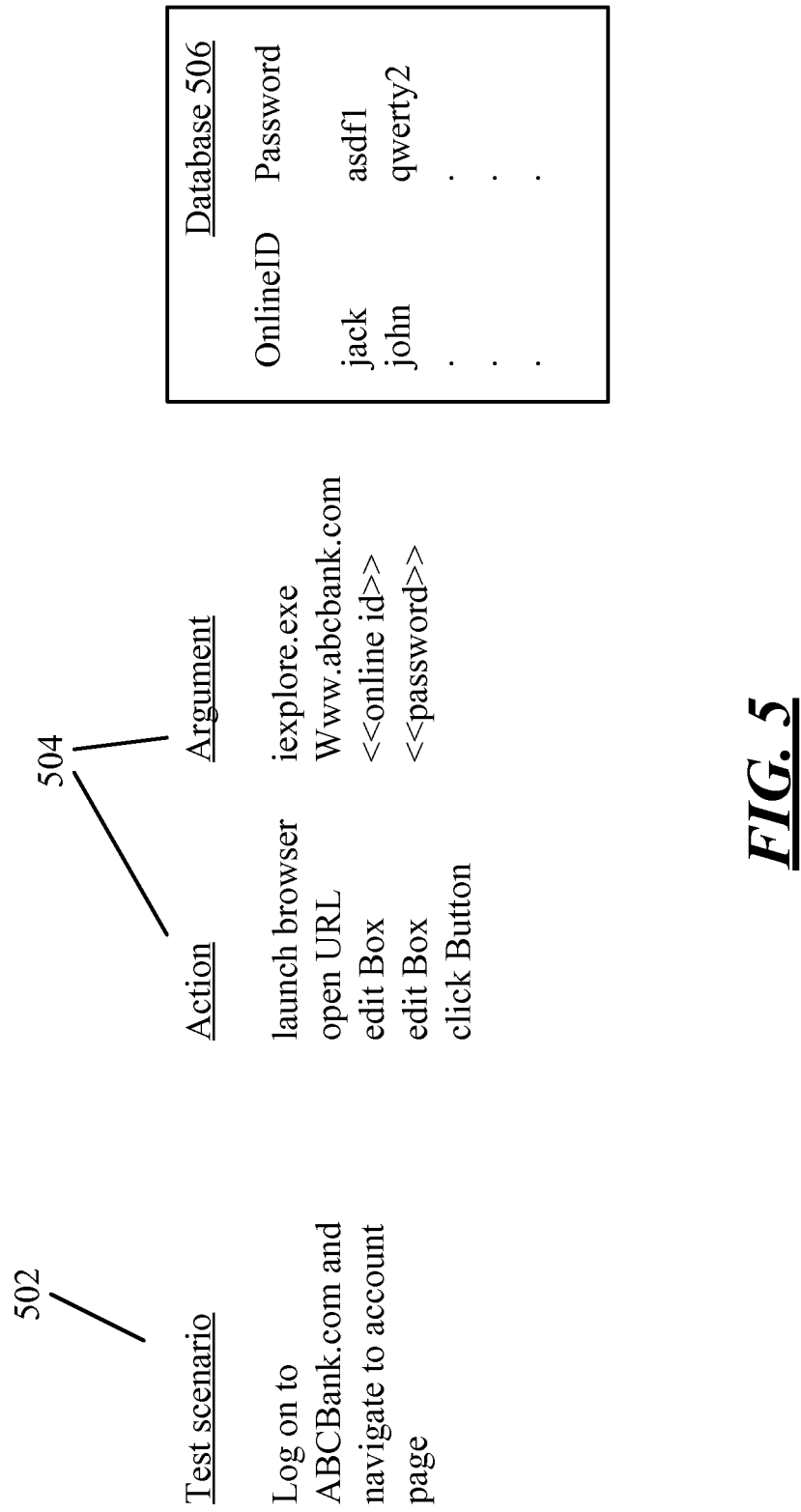
FIG. 5 is a block diagram of example actions that could be specified in a test scenario.

FIG. 5 shows an example of types of actions that could be specified in a test scenario. FIG. 5 shows an example in which a web application is being tested, although any type of software could be tested. Test scenario 502 involves logging onto the web site of ABCBank.com, and navigating to the "account" page of that web site. Thus, the test to be performed on the web application is to determine whether, given the appropriate input, the web application will allow the user to navigate to the account page.

504 shows various example actions that could be used to interact with the web application in order to carry out test scenario 502. Some or all of the actions could have arguments. For example, in order to perform the test scenario, one action may be to launch a browser, where the argument is the name of a specific browser (e.g., iexplore.exe). Another action could be to open a specific Uniform Resource Locator (URL), which, in this case (as specified by the argument) is abcbank.com. This might take the user to a logon page for abcbank.com. Other actions could be to enter an identifier and password into appropriate boxes. The values to be entered could be specified in the actions as variables (e.g., <<onlineid>> and <<password>>), and the actual values (or pairs of values) could be obtained from database 506, which lists replacement candidates for the variables (e.g., valid pairs of values for the onlineid and password variables). The values in database 506 could be substituted for the variables and entered in the boxes during a testing process. After the appropriate information is entered into the boxes, the next action to be performed could be to click the submit button. Clicking submit on the logon page may take the user to the account page, in which case the test scenario would be completed. Performing these actions might result in the expected behavior, or not. Either way, the result of the action could be reported.

At 504, various abstract actions that could be performed are shown. These actions could be part of a test specification. (FIG. 5 shows the actions being specified in the form of a list, although, as previously noted, a specification could be in an XML format, or in any other format.)

Figure 6:
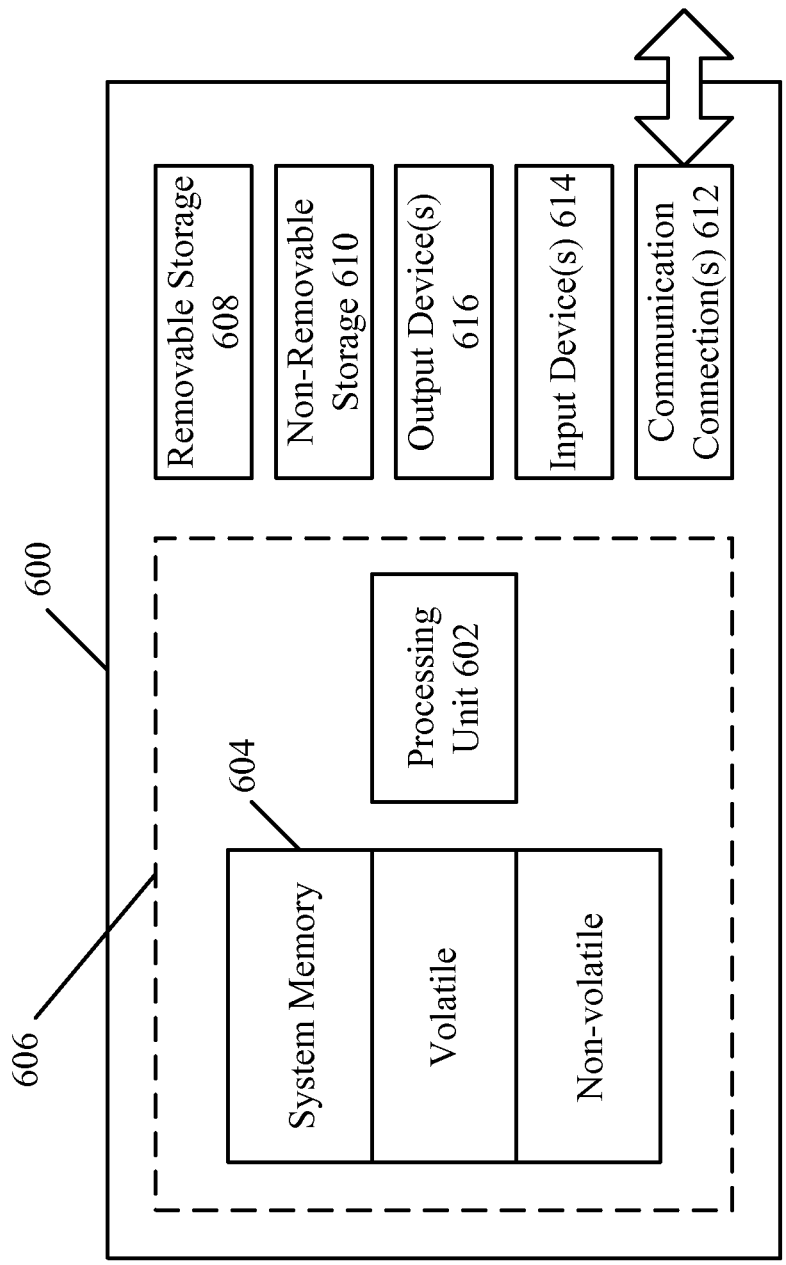
FIG. 6 is a block diagram of an example computing environment that may be used in connection with implementations of the subject matter described herein.

The subject matter described herein may be implemented through the use of a computer system, or other type of device that has some computing mechanism(s). FIG. 6 shows an example computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the previously-described systems or devices, and the like.

Computer-executable instructions, such as program modules, being executed by a computer may be used. Generally, program modules include routines, programs, objects, components, data structures, etc., that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an example system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by computing device 600 and includes both volatile and non-volatile media, removable and non-removable media. By way of example, and not limitation, computer readable media may comprise computer storage media and communication media.

Computer storage media includes volatile and non-volatile, removable and non-removable media implemented in any method or technology for storage of information such as computer readable instructions, data structures, program modules or other data. Memory 604, removable storage 608, and non-removable storage 610 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may also contain communications connection(s) 612 that allow the device to communicate with other devices. Communications connection(s) 612 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Computing device 600 may also have input device(s) 614 such as keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described previously. Rather, the specific features and acts described previously are disclosed as example forms of implementing the claims.

The invention claimed is:

1. A non-transitory computer-readable medium comprising computer-readable instructions for testing and implementing software, the computer-readable instructions comprising:
   instructions that store a code component in a repository wherein plurality of code components that make up the software includes the code component;
   instructions that store, in said repository, a specification of a first test of said code component, said repository maintaining a dependency graph that indicates a dependency between said specification and said code component;
   instructions that receive a request to perform a second test on the software, wherein the software makes use of the code component;
   instructions that determine that said specification having the dependency with said code component is up to date relative to said code component by comparing a date associated with said specification and a date associated with said code component;
   instructions that test the code component included in the software based on the up to date specification; and
   instructions that provide one version of the code component if a first release of the software is called for implementation and provide another version of the code component if a second release of the software is called for implementation.

2. The computer-readable medium of claim 1, wherein the code component included in the software is tested using a test engine, and wherein the computer-readable instructions further comprise:
   instructions that convert said specification into a language used by said test engine.

3. The computer-readable medium of claim 1, wherein the computer-readable instructions further comprise:
   instructions that store, in said repository, version information about said code component and said specification.

4. The computer-readable medium of claim 1, wherein said date associated with said code component is a date on which said code component was last updated, and wherein date associated with said specification is a date on which said specification was last updated.

5. The computer-readable medium of claim 1, wherein said specification is in an eXtensible Markup Language (XML) format, and wherein the computer-readable instructions further comprise:
   instructions that use an XML schema to interpret said specification.

6. The computer-readable medium of claim 1, wherein said request is received from a test server, wherein said code component included in the software is tested on said test server, and wherein the computer-readable instructions further comprise:
   instructions that deliver said code and said specification to said test server.

7. The computer-readable medium of claim 1, wherein said specification indicates a variable to be used in testing the code component included in the software, and wherein the computer-readable instructions further comprise:
   instructions that retrieve, from a data store, a value to be substituted in place of said variable; and
   instructions that provide said value as input to the software.

8. A system for testing and implementing software, comprising:
   a computer system including a processor; and
   non-transitory computer-readable medium storing instructions executable by the processor to:
   store a code component in a repository wherein a plurality of code components that make up the software includes the code component;
   store, in said repository, a specification of a first test of said code component, said repository maintaining a dependency graph that visually indicates a dependency between said specification and said code component;
   receive a request to perform a second test on the software, wherein the software makes use of the code component;
   determine that said specification having the dependency with said code component is up to date relative to said code component by comparing a last modified date associated with said specification and a last modified date associated with said code component;
   test the code component included in the software based on the up to date specification; and
   provide one version of the code component if a first release of the software is called for implementation and provide another version of the code component if a second release of the software is called for implementation.

9. The system of claim 8, wherein the code component included in the software is tested using a test engine, and wherein the system further comprises a converter that converts said specification into a language used by said test engine.

10. The system of claim 8, further comprising
    instructions executable by the processor to store in said repository, version information about said code component and said specification.

11. The system of claim 8,
    wherein the last modified date associated with said code and the last modified date associated with said specification are stored in said repository.

12. The system of claim 8, wherein said specification is in an eXtensible Markup Language (XML) format, and wherein the system further comprises a converter that:
    uses an XML schema to interpret said specification.

13. The system of claim 8, wherein said request is received from a test server, wherein said code component included in the software is tested on said test server, and wherein the system further included instructions executable by the processor that:
    deliver said code and said specification to said test server.

14. The system of claim 8, wherein said specification indicates a variable to be used in testing code component included in the software, and wherein the system further comprises instructions executable by the processor that:
    retrieve, from a data store, a value to be substituted in place of said variable; and
    provide said value as input to the software.

15. A method of testing and implementing software, the method comprising:
    storing a code component in a repository wherein a plurality of code components that make up the software includes the code component;
    storing, in said repository, a specification of a first test of said code component, said repository maintaining a dependency graph that indicates a dependency between said specification and said code component;
    receiving a request to perform a second test on the software, wherein the software makes use of the code component;
    determining that said specification having the dependency with said code component is up to date relative to said code component by comparing a last modified date associated with said specification and a last modifies date associated with said code component;

testing the code component included in the software based on the up to date specification; and providing one version of the code component if a first release of the software is called for implementation and provide another version of the code component if a second release of the software is called for implementation.

16. The method of claim 15, wherein the code component included in the software is tested using a test engine, and wherein the method further comprises:

converting said specification into a language used by said test engine.

17. The method of claim 15, further comprising:

storing, in said repository, version information about said code component and said specification.

18. The method of claim 15, wherein said specifications in an eXtensible Markup Language (XML) format, and wherein the method further comprises:

using an XML schema to interpret said specification.

19. The method of claim 15, wherein said request is received from a test server, wherein said code component included in the software is test on said test server, and wherein the method further comprises:

delivering said code and said specification to said test server.

20. The method of claim 15, wherein said specification indicates a variable to be used in testing said code component included in the software, and wherein the method further comprises:

retrieving, from a data store, a value to be substituted in place of said variable; and providing said value as input to the software.

* * * * *